March 14, 1944.    C. D. GRIFFITHS    2,344,038
WHEEL AND TIRE LOCK
Filed April 13, 1942
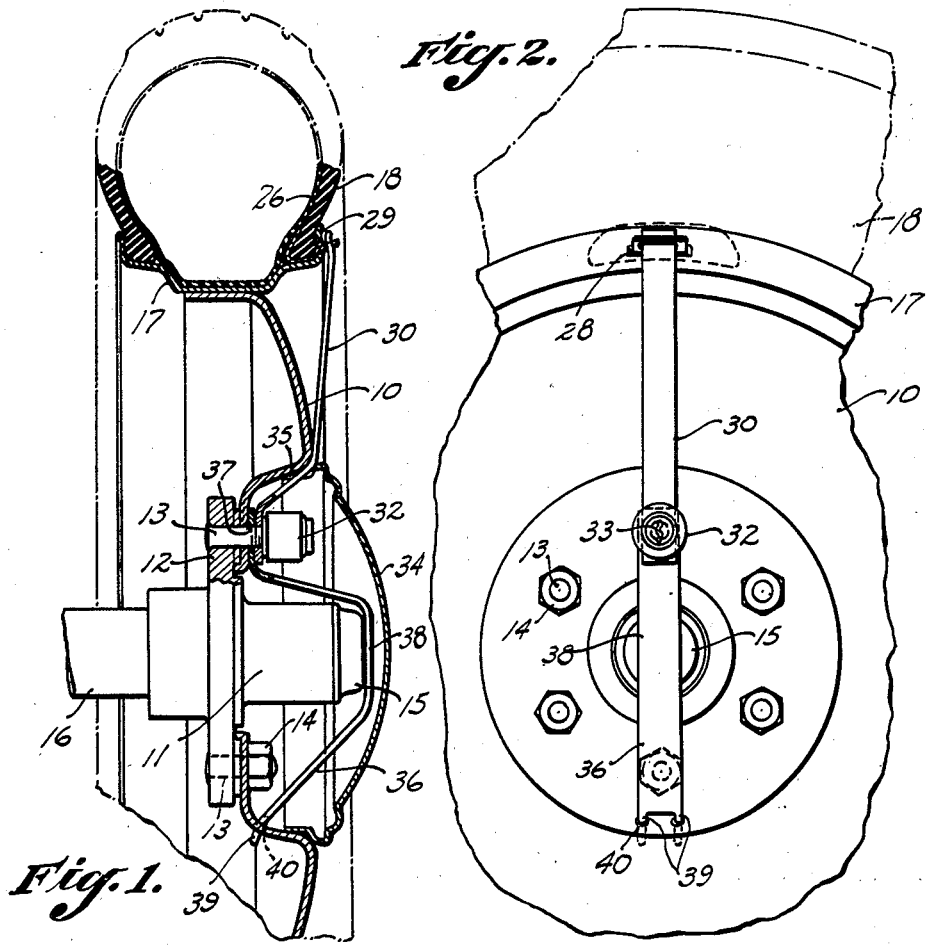
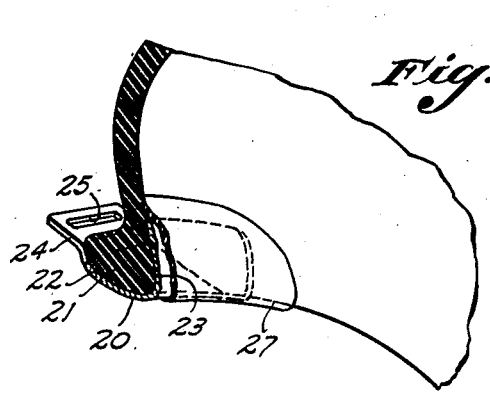
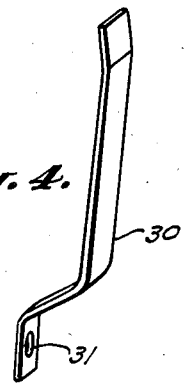
INVENTOR.
Charles D. Griffiths
BY
ATTORNEY.

Patented Mar. 14, 1944

2,344,038

UNITED STATES PATENT OFFICE 2,344,038

WHEEL AND TIRE LOCK

Charles D. Griffiths, Long Beach, Calif.

Application April 13, 1942, Serial No. 438,734

7 Claims. (Cl. 70—259)

This invention relates to improvements in locking apparatus for tires and wheels mounted in operative condition on automobiles or when carried thereby as a spare.

The primary object of the invention is to provide latching apparatus of simple and practicable construction to prevent the unauthorized removal of an automobile tire when mounted upon a wheel and which will retain the tire in locked condition during the usual operation of the car without adversely affecting the normal performance or appearance of the wheel and which may be readily released for changing tires by the application of a key.

A further object of my invention is the provision of locking apparatus for preventing the removal of the car wheels by the simple and novel expedient of effectively extending the aforementioned tire latching apparatus integrally or by an extension bar to prevent the displacement of the hub cap.

Other objects and advantages residing in my invention, and objects relating to details of construction and arrangements of parts thereof, will be fully set forth in the detailed description to follow:

The accompanying drawing illustrates by way of example a representative form of my invention, in which:

Fig. 1 is a partial view in cross section of an automobile wheel and tire with latching apparatus embodying my invention shown in side elevation, Fig. 2 is a similar view of the same in front elevation with the dust cap removed, Fig. 3 is a fragmentary view of a portion of a tire showing in transverse section the tire securing plate with which the latch bar cooperates to secure the tire upon the wheel rim, and Fig. 4 is a detached perspective view of the latch bar element of the invention.

Referring to said views, the reference numeral 10 indicates an automobile wheel, and numeral 11 the hub therefor to whose flange 12 the wheel is secured by stud bolts 13 and nuts 14. The numeral 15 indicates a hub cap removably secured to the wheel hub 11 and enclosing an axle nut, not shown, which secures the wheel upon the axle 16 of the car. At its perimeter, the wheel 10 is provided with a rim 17 upon which a tire 18 is mounted. The wheel parts and tire thus particularized are of standard or usual contruction and relatively slight changes or additions thereto are required to admit of adapting and applying the latching apparatus of my invention.

The tire 18 is modified only by the attachment thereto of suitable securing means such for example of the metal plate 20 which is shaped to closely conform to the contour of the tire bead 21, as shown at 22. The securing plate 20 preferably extends around the bead and against the inner face of the tire wall, as shown at 23 in Fig. 3, to provide a firm support and anchor for the protruding tongue 24 which extends outwardly of the tire at the opposite end of the plate. The plate 20 in its engagement with the tire may extend for several inches along the bead and is preferably narrowed down in the projecting tongue 24 wherein a slot 25 is formed in its outer extremity. The plate 20 is secured to the inner face of the tire wall along the bead by vulcanizing a rubber fabric patch 27 to the plate and vulcanizing or cementing the patch and plate to the tire wall. The patch may if desired cover both faces of the plate to facilitate adhesion, and further protect the inner tube 26 from abrasion. The wheel rim 17 is modified only by forming a slot 28 in its outer flange 29 through which the tongue 24 may protrude.

A latch bar 30 is provided which extends at one end through the slot 25 of the tongue 24 exteriorly of the rim flange 29. The bar 30 is desirably of the same width and thickness throughout its length and is designed to fit snugly within the slot 25 to prevent motion therein and thus avoid rattles in the operation of the wheel. To secure the tire to the rim, the latch bar 30 extends radially inwardly of the wheel and its inner end, as seen in Fig. 4, is formed with an aperture 31 to receive a stud bolt 13 located in the central portion of the wheel. The bolt 13 extending through said bar end is engaged by a nut, which may be slotted or modified from the form shown at 14 to receive the locking dog, not shown, of a locking cap 32 arranged to extend over said nut and including locking mechanism in its outer end actuated by a removable key filling the key slot 33. A dust cap 34 frictionally mounted to protect the hub portion of the wheel is formed with a slot 35 in its perimeter to accommodate the extension of the latch bar towards its point of connection with the wheel.

The tire protective devices described are characterized by their simplicity of construction and economy of means to provide the utmost of safety from theft of the tire. The parts are readily assembled and secured and are in no way conspicuous or unsightly in appearance. The bar is firmly anchored at both of its ends and will develop no rattles or extraneous noises in the operation of the car, and the wheel may be easily counter-balanced as needed.

To protect the wheel from unauthorized removal, I have provided what is, in effect, an extension of the latch bar 30 consisting, as shown in Figs. 1 and 2, of a substantially U-shaped bar 36 having an aperture 37 at one end to receive the stud 13 therethrough and engage the inner end of the bar 30 where it is secured by the locking cap 32. The bar thence extends outwardly of the wheel to overlie the hub cap 15, as at 38, whence it extends inwardly and terminates in a bent and reduced end portion to enter a correspondingly formed slot in the wheel body, or, as shown in said views, it may terminate in a pair of prongs 39 received in a pair of corresponding holes 40 formed in the wheel body.

With the bar 36 mounted and secured as described, the center portion 38 prevents the hub cap 15 from being unscrewed and thus prevents access to the axle nut so that the wheel cannot be removed from the axle.

It will be understood, of course, that various modifications can be made of the parts as shown herein, and that the form of my invention shown herein is merely illustrative of the invention as defined in the appended claims.

I claim:

1. A device for preventing the theft of a tire mounted on a wheel rim having a slot in one face thereof, which includes: a member secured to the inside face of a wall of said tire and extending around the bead thereof and through said rim slot; and a second member adapted to engage the outer end of said first member and said wheel and means for locking said second member to said wheel.

2. A device for preventing the theft of a tire mounted on a wheel rim having a slot in one face thereof, which includes: a plate cemented to the inside face of a wall of said tire and extending around the bead thereof and out through said rim slot, said plate having a slot in its outer end; a rigid bar extending radially of said wheel with one end inserted in said plate slot and its other end engaging a stud protruding from the central portion of said wheel; and means for locking the inner end of said bar to said stud to prevent the unauthorized removal thereof.

3. A device for preventing the theft of a tire mounted on a wheel rim having a slot in one face thereof, which includes: a plate cemented to the inside face of a wall of said tire and extending around the bead thereof and out through said rim slot; a rigid bar extending radially of said wheel with one end engaging the outer end of said plate member, and its other end engaging the central portion of said wheel; and means for locking the inner end of said bar to said wheel to prevent the unauthorized removal thereof.

4. A device for preventing the theft of a tire mounted on a wheel rim having a slot in one face thereof, which includes: a member secured to the inside face of a wall of said tire and extending around the tire bead and out through said rim slot; a bar engaging the outer end of said flat member and extending radially inwardly therefrom to the central portion of said wheel; and means for locking the free end of said bar to said wheel to prevent its removal therefrom.

5. A locking member adapted to be secured to the inside face of a wall of a tire and extend through a slot in the rim upon which said tire is mounted, which includes: a generally L-shaped plate, one leg of which is relatively wide for engagement with said tire wall, and the other leg of which is relatively narrow for insertion in said rim slot; and a rubber patch vulcanized to the wider leg of said plate and adapted to be cemented to the inner face of said tire wall, said plate being shaped to conform to the shape of the tire bead and have its narrower leg extend between said bead and said rim.

6. A device for preventing the theft of a tire mounted on a wheel rim having a slot in one face thereof, which includes: a member secured to the inside face of a wall of said tire and extending around the bead thereof and out through said rim slot; a second member extending radially of said wheel with one end engaging the outer end of said first member, and its other end engaging the central portion of said wheel; and means for locking the inner end of said second member to said wheel to prevent the unauthorized removal thereof.

7. A device for preventing the theft of a tire mounted on a wheel rim which includes: a plate cemented to the inside face of a wall of said tire and extending around the bead thereof and laterally beyond the edge of said rim; a rigid bar extending radially of said wheel with one end engaging the outer end of said plate member, and its other end engaging the central portion of said wheel; and means for locking the inner end of said bar to said wheel to prevent the unauthorized removal thereof.

CHARLES D. GRIFFITHS.